United States Patent
Oga et al.

[11] Patent Number: 6,148,638
[45] Date of Patent: Nov. 21, 2000

[54] METHOD FOR MANUFACTURING A FLUORESCENT LAMP

[75] Inventors: Toshiyoshi Oga, Shiga; Masaru Saito; Akihito Wakamiya, both of Osaka, all of Japan

[73] Assignee: Matsushita Electronics Corporation, Osaka, Japan

[21] Appl. No.: 09/248,884

[22] Filed: Feb. 11, 1999

[30] Foreign Application Priority Data

Mar. 20, 1998 [JP] Japan ................................. 10-072417

[51] Int. Cl.$^7$ .................................................. C03C 27/02
[52] U.S. Cl. ................................ 65/59.2; 65/110; 65/108; 65/59.27; 445/22; 313/493; 313/484; 313/182
[58] Field of Search .............................. 65/108, 110, 59.2, 65/59.27; 445/22; 313/493, 484, 182

[56] References Cited

U.S. PATENT DOCUMENTS

| | | | |
|---|---|---|---|
| 4,545,774 | 10/1985 | Van Gils | ................................... 445/22 |
| 5,090,931 | 2/1992 | Shiraishi . | |
| 5,801,484 | 9/1998 | Bankuti et al. . | |

FOREIGN PATENT DOCUMENTS

| | | |
|---|---|---|
| 0 151 647 | 8/1985 | European Pat. Off. . |
| 0 758 795 | 2/1997 | European Pat. Off. . |
| 861 419 | 2/1993 | Japan . |
| 970929 | 12/1996 | Japan . |
| 2 048 562 | 12/1980 | United Kingdom . |
| 2 277 634 | 11/1994 | United Kingdom . |
| WO 96/16427 | 5/1996 | WIPO . |

*Primary Examiner*—James Derrington
*Assistant Examiner*—Mark Halpern
*Attorney, Agent, or Firm*—Merchant & Gould P.C.

[57] ABSTRACT

In a method for manufacturing a fluorescent lamp, four dual tubes that are previously manufactured are held at a distance in such a manner that the dual tubes can move horizontally. Four portions for connection are simultaneously heated, and two of the dual tubes are simultaneously moved horizontally to form bridge portions to provide tube assemblies. Furthermore, annealing after bridge connection and the connection of tube assemblies with a bridge are performed simultaneously. Thus, a compact fluorescent lamp comprising eight glass tubes that are connected with bridges to form continuous discharge paths can be obtained. According to the manufacturing method, bridge connection can be performed in a small space and with high productivity, and a fluorescent lamp having a good quality with minor variations in the quality of the bridge portions can be provided.

13 Claims, 8 Drawing Sheets

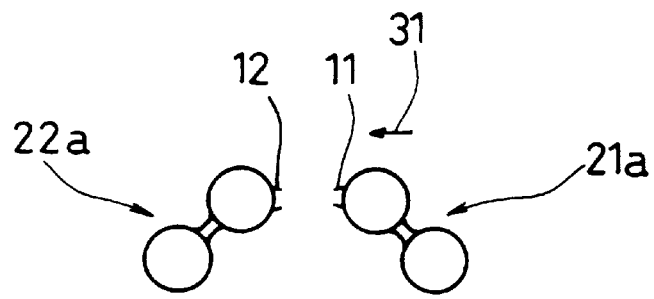
FIG.6A
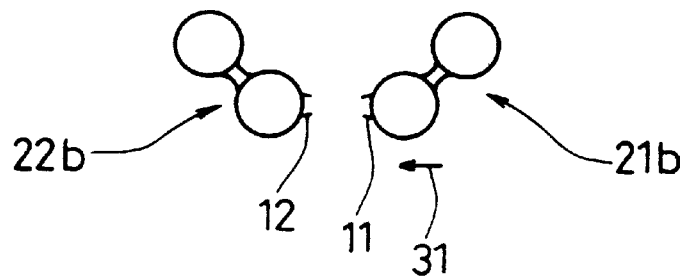
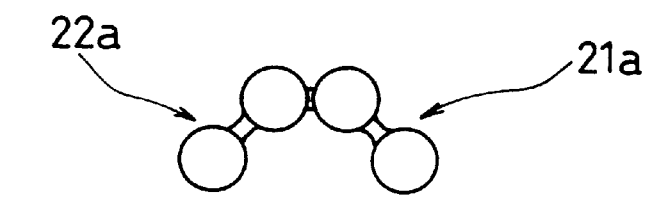
FIG.6B
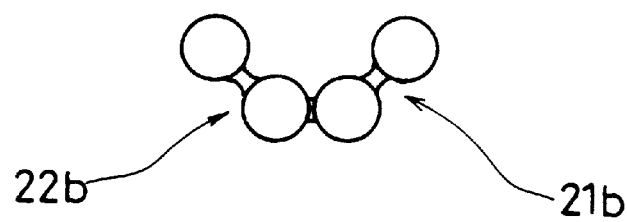
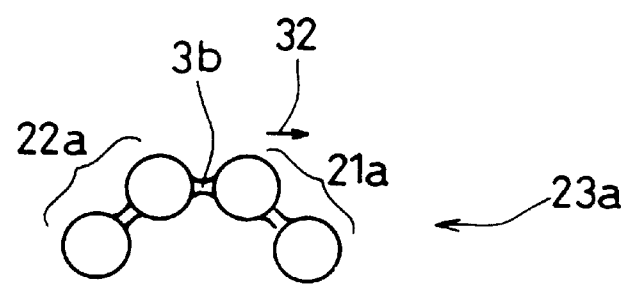
FIG.6C
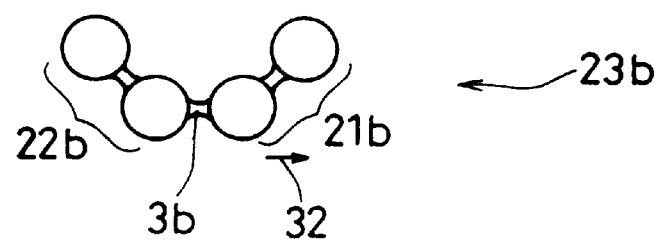

METHOD FOR MANUFACTURING A FLUORESCENT LAMP

FIELD OF THE INVENTION

The present invention relates to a method for manufacturing a fluorescent lamp.

BACKGROUND OF THE INVENTION

Compact one-base type fluorescent lamps in which a plurality of glass tubes are connected with bridges to form a discharge path are known from Japanese Design Registration Nos. 861,419 and 970,929.

The bridge connection of the glass tubes of such a fluorescent lamp is performed by the method shown in Japanese Patent Application (Tokko Sho) No. 63-49334.

That is, a portion of the outer surface of a glass tube for bridge connection is heated and softened, and a gas is supplied into the glass tube to subject the glass tube to a high pressure so as to form an opening portion that protrudes outward in the softened portion. This glass tube is located adjacent to another glass tube having a similarly formed opening portion in such a manner that their opening portions face each other, and the opening portions are welded to each other so as to form a bridge portion.

For connecting three or more glass tubes with bridges, first, many dual tubes, each of which is connected with a bridge as described above, are manufactured. Then, the dual tubes are connected with a bridge in turn by the same method. Alternatively, a required number of glass tubes are connected with a bridge one by one in turn by the above method.

As described above, in order to connect glass tubes with a bridge, the steps of heating, softening, opening, welding, bridge formation and the like should be performed in turn. For industrial bridge connection, a device for performing the steps is necessary. Furthermore, if the number of bridge connections increases, the number of steps that are required to complete a fluorescent lamp increases accordingly, thereby further complicating the device.

For example, when dual tubes that are formed by connecting two glass tubes with a bridge are connected with a bridge in turn for a plurality of times as described above, the device becomes complicated and large, thereby increasing the number of steps, the working time, and the cost. In addition, variations in the size, accuracy, and strength of the bridge portions of the product are large. Therefore, the quality of the product is not stable, and problems in quality and a decrease in yield increase the cost. The above problems are especially significant in a fluorescent lamp having more than four glass tubes and more than two dual tubes.

SUMMARY OF THE INVENTION

In order to solve the above problems, it is an object of the present invention to provide a method for manufacturing a fluorescent lamp, in which eight glass tubes are connected with bridges in a small space, with a few steps, for a short working time, with good productivity, and at a low cost without complicating the device and increasing the size of the device. It is another object of the present invention to provide a method for manufacturing a fluorescent lamp that has a stable good quality with a high yield without variations in the size, accuracy, and strength of the bridge portions.

In order to achieve the above objects, according to a first aspect of the present invention, a method for manufacturing a fluorescent lamp comprising eight glass tubes that are arranged parallel to each other around a central axis and connected with a bridge in turn to form a discharge path comprises the step of manufacturing two of first dual tubes comprising a glass tube with an electrode and a glass tube without an electrode that are connected with a bridge and two of second dual tubes comprising two glass tubes without an electrode that are connected with a bridge. The first and second dual tubes are located substantially parallel to each other at a distance in such a manner that one of the first dual tubes is located on each side of two of the second dual tubes, with the glass tubes with the electrode located distally with respect to the second dual tubes. Portions for connection of the first and second dual tubes that are adjacent to each other are simultaneously heated for softening to form opening portions. At least one of the first and second dual tubes with the opening portion is moved horizontally so that the opening portions are contacted with and welded to each other, and the moved dual tube is pulled back a predetermined distance, thereby forming two tube assemblies comprising the first and second dual tubes that are connected with a bridge. Portions for connection of the two tube assemblies are simultaneously heated for softening to form opening portions. At least one of the tube assemblies is moved horizontally so that the opening portions are contacted with and welded to each other, and the moved tube assembly is pulled back a predetermined distance, thereby completing connection of the eight glass tubes with bridges.

In the first aspect, first, two of the first dual tubes and two of the second dual tubes are simultaneously connected with a bridge to manufacture two tube assemblies comprising the first and second dual tubes, then the two tube assemblies are connected with a bridge. According to this aspect, two bridge connections are performed simultaneously. Therefore, the steps of heating, softening, opening, welding, bridge formation and the like need not be repeated for each bridge connection, so that the manufacturing time can be shortened. In addition, the device for operating the steps in turn can be simplified. Furthermore, variations in the quality of the two bridge portions that are simultaneously formed decreases. Thus, a fluorescent lamp having a good quality can be provided stably.

In the first aspect, it is preferable that each glass tube is positioned on a circle or at an apex of a polygon (preferably a regular polygon) in locating the first and second dual tubes substantially parallel to each other at a distance. According to the preferable example, devices that are necessary for bridge connection, jigs and the like can be moved and operated within a space defined by the circle or polygon. Thus, the working space can be reduced. In particular, from the viewpoint of device design and working efficiency, it is preferable to locate the dual tubes in such a manner that the bridge portions of four dual tubes are positioned at the apexes of a rectangle, most preferably a square, because the horizontal movement of the dual tubes can be limited only in a longitudinal or transverse direction and a plurality of the dual tubes can be moved simultaneously in the same direction.

In the first aspect, it is preferable that the bridges between the first and second dual tubes are formed by simultaneously moving two of the first or second dual tubes. According to the preferable example, the bridges are formed by simultaneously moving two of the first or second dual tubes horizontally. Therefore, a fluorescent lamp with minor variations in the quality of bridge portions can be manufactured in a small space, with a few working steps, and at a low cost.

In the first aspect, it is preferable that the bridge between the tube assemblies is formed by moving one of the tube assemblies. According to the preferable example, the bridge is formed by moving only one of the tube assemblies horizontally. Therefore, a fluorescent lamp can be manufactured in a small space, with a few working steps, and at a low cost.

In the first aspect, it is preferable that one of the dual tubes is not moved horizontally during bridge connection. According to the preferable example, the bridges are formed in turn by fixing one of the dual tubes and collecting the other dual tubes toward the fixed dual tube. Therefore, there is no waste of a device for moving the dual tubes for bridge connection and jigs, so that the device and the jigs can be placed in a small space without difficulty. Thus, the production efficiency improves, and a fluorescent lamp can be manufactured at a low cost. In addition, by reducing the moving members, the rigidity of the device improves and the vibration and wavering of the device during manufacture decrease. Therefore, a fluorescent lamp having a stable quality can be manufactured.

In the first aspect, it is preferable that the bridges between the first and second dual tubes are annealed while forming the bridge between the two tube assemblies. According to the preferable example, the annealing of the bridge formed between the first and second dual tubes and the next step of forming the bridge between the tube assemblies (that is, the steps of heating, softening, opening, welding, and bridge formation) are performed simultaneously. Therefore, the working time can be shortened, the productivity improves, and a fluorescent lamp can be manufactured at a low cost.

In the first aspect, it is preferable that the heating of the portions for connection comprises preheating and main heating. According to the preferable example, the temperature of the glass tubes is gradually increased during preheating at a relatively low temperature, and then main heating is performed so as to reduce a rapid thermal load to the glass tubes and avoid problems such as the cracking of the heated portions. Therefore, bridge portions having a good uniform quality can be formed.

According to a second aspect of the present invention, a method for manufacturing a fluorescent lamp comprising eight glass tubes that are arranged parallel to each other around a central axis and connected with a bridge in turn to form a discharge path comprises the step of manufacturing two of first dual tubes comprising a glass tube with an electrode and a glass tube without an electrode that are connected with a bridge and two of second dual tubes comprising two glass tubes without an electrode that are connected with a bridge. The first and second dual tubes are located substantially parallel to each other at a distance in such a manner that one of the first dual tubes is located on each side of two of the second dual tubes, with the glass tubes with the electrode located distally with respect to the second dual tubes. Portions for connection of two of the second dual tubes that are adjacent to each other are simultaneously heated for softening to form opening portions. At least one of the second dual tubes with the opening portion is moved horizontally so that the opening portions are contacted with and welded to each other, and the moved second dual tube is pulled back a predetermined distance, thereby forming a tube assembly comprising two of the second dual tubes that are connected with a bridge. Portions for connection of the tube assembly and the first dual tubes on both sides of the tube assembly are simultaneously heated for softening to form opening portions. At least one of the tube assembly and the first dual tubes is moved horizontally so that the opening portions are contacted with and welded to each other, and the at least one of the tube assembly and the first dual tubes is pulled back a predetermined distance, thereby completing connection of the eight glass tubes with bridges.

In the second aspect, first, the second dual tubes are connected with a bridge to manufacture a tube assembly comprising two of the second dual tubes, then the tube assembly and the first dual tubes located on both sides of the tube assembly are simultaneously connected with bridges. According to this aspect, two bridge connections are performed simultaneously. Therefore, the steps of heating, softening, opening, welding, bridge formation and the like need not be repeated for each bridge connection. Thus, the manufacturing time can be shortened. In addition, the device for operating the steps in turn can be simplified. Furthermore, variations in the quality of the two bridge portions that are simultaneously formed decreases. Thus, a fluorescent lamp having a good quality can be provided stably.

In the second aspect, it is preferable that the bridge between two of the second dual tubes is formed by moving one of the second dual tubes. According to the preferable example, the bridge is formed by moving only one of the second dual tubes horizontally. Therefore, a fluorescent lamp can be manufactured in a small space, with a few working steps, and at a low cost.

In the second aspect, it is preferable that the bridges between the tube assembly and the first dual tubes are formed by moving the tube assembly or moving two of the first dual tubes simultaneously. According to the preferable example, the bridges are formed by moving the tube assembly or two of the first dual tubes horizontally. Therefore, a fluorescent lamp with minor variations in bridge portions can be manufactured in a small space, with a few working steps, and at a low cost.

In the second aspect, it is preferable that one of the dual tubes is not moved horizontally during bridge formation. According to the preferable example, the bridges are formed in turn by fixing one of the dual tubes and collecting the other dual tubes toward the fixed dual tube. Therefore, there is no waste of the device for moving the dual tubes for bridge connection and jigs, so that the device and the jigs can be placed in a small space without difficulty. Therefore, the production efficiency improves, and a fluorescent lamp can be manufactured at a low cost. In addition, by reducing the moving members, the rigidity of the device improves and the vibration and wavering of the device during manufacture decrease. Therefore, a fluorescent lamp having a stable quality can be manufactured.

In the second aspect, it is preferable that the bridge between the second dual tubes of the tube assembly is annealed while forming the bridges between the tube assembly and the first dual tubes on both sides of the tube assembly. According to the preferable example, the annealing of the bridge formed between the second dual tubes and the next step of forming the bridges between the tube assembly and the first dual tubes (that is, the steps of heating, softening, opening, welding, and bridge formation) are simultaneously performed. Therefore, the working time can be shortened, the productivity improves, and a fluorescent lamp can be manufactured at a low cost.

In the second aspect, it is preferable that the heating of the portions for connection comprises preheating and main heating. According to the preferable example, the temperature of the glass tubes is gradually increased during preheating at a relatively low temperature, and then main heating is performed so as to reduce a rapid thermal load to the glass tubes and avoid problems, such as the cracking of the heated portions. Therefore, bridge portions having a good uniform quality can be formed.

BRIEF DESCRIPTION OF THE DRAWINGS

FIG. 6 shows part of the steps of the manufacturing method according to the first embodiment, FIG. 6(A) being a plan view showing an example of the movement of the dual tubes with an opening portion, FIG. 6 (B) being a plan view showing the state in which the opening portions of the first and second dual tubes are contacted with and welded to each other, and FIG. 6(C) being a plan view showing an example of the movement of pulling back the first and/or second dual tubes a predetermined distance;

DETAILED DESCRIPTION OF THE INVENTION

The present invention will be described below with reference to the drawings.

Figure 1A:
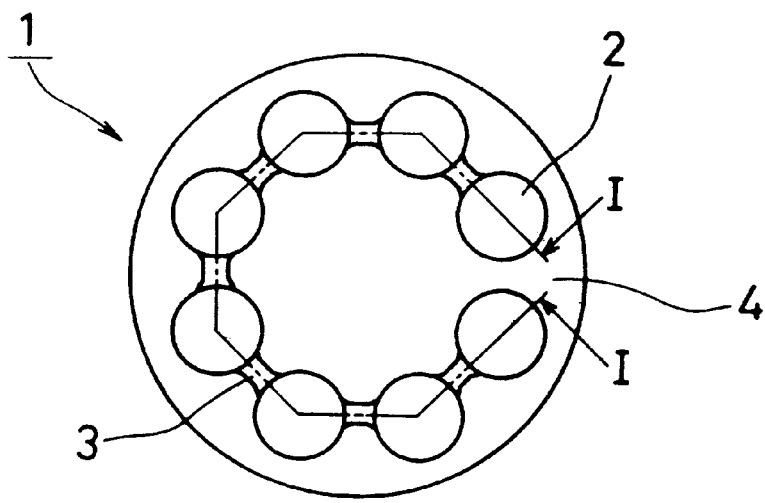
FIG. 1 schematically shows the appearance of an example of a fluorescent lamp obtained by the manufacturing method of the present invention, FIG. 1(A) being a plan view, and FIG. 1(B) being a front view.
Figure 1B:
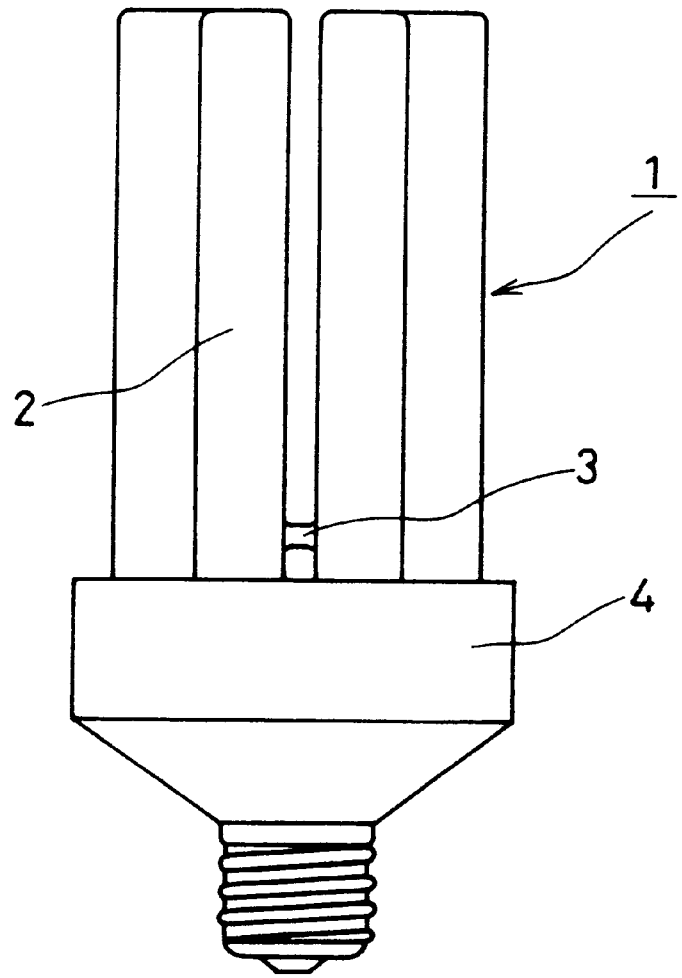
Figure 2:
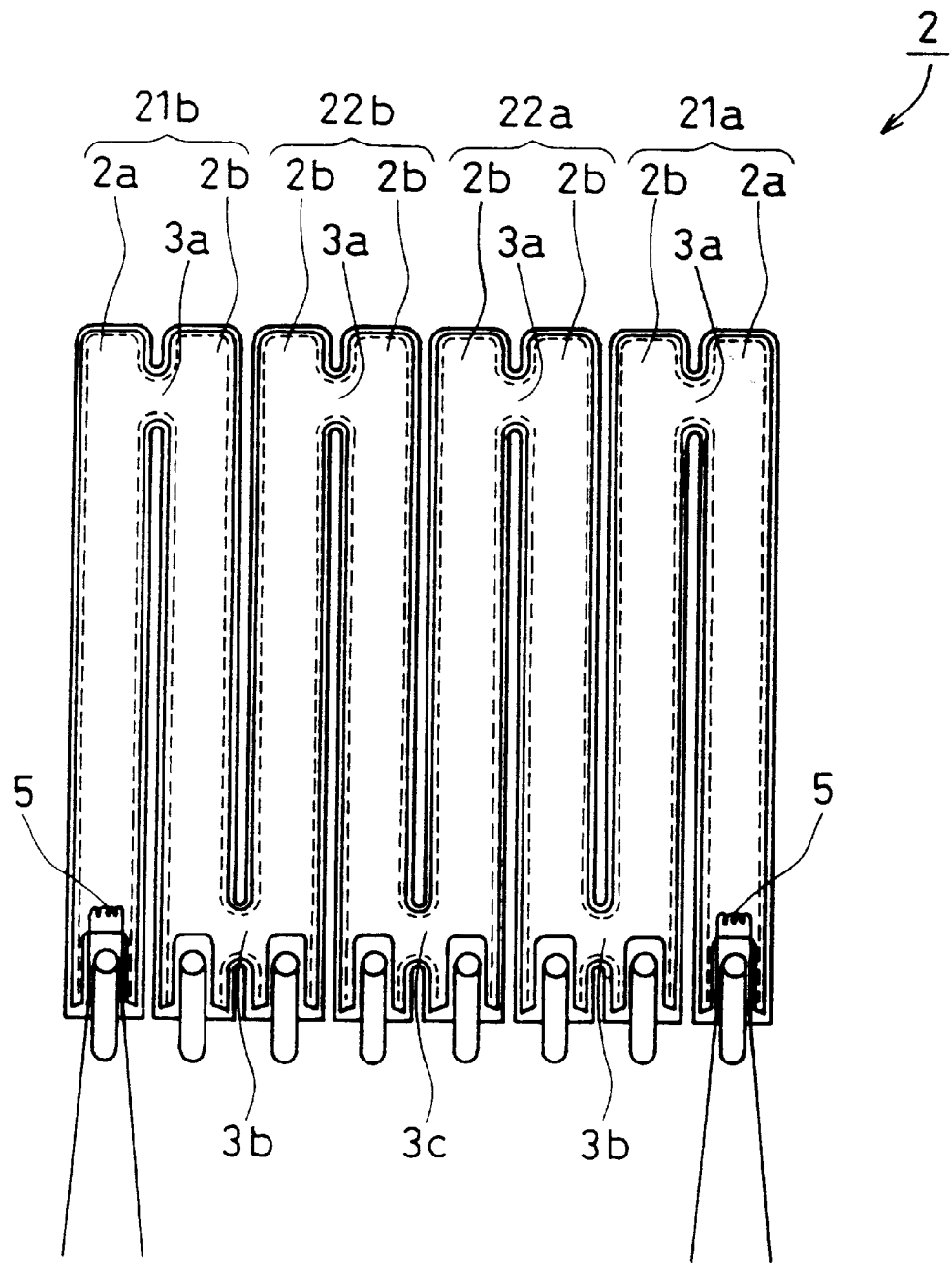
FIG. 2 is a development in section taken along the line I—I of FIG. 1 (A) as seen from the arrow directions, in which a glass tube assembly having eight glass tubes that are connected with bridges is cut on each plane that includes the central lines of adjacent two glass tubes and developed.

FIG. 1 schematically shows the appearance of an example of a fluorescent lamp obtained by the manufacturing method of the present invention. FIG. 1(A) is a plan view, and FIG. 1(B) is a front view. FIG. 2 is a development in section taken along the line I—I of FIG. 1(A) as seen from the arrow directions, in which a glass tube assembly 2 having eight glass tubes that are connected with bridges is cut on each plane that includes the central lines of two adjacent glass tubes and developed.

As is apparent from these figures, the fluorescent lamp 1 of the present invention comprises the glass tube assembly 2 comprising eight cylindrical glass tubes that are located substantially parallel to each other at substantially the same distance in such a manner that the central lines of the glass tubes are positioned on substantially the same circumference and connected with bridge portions 3 (3a, 3b and 3c) in turn. Base 4 holds the glass tube assembly 2 and comprises electrode terminals for supplying electric power to electrodes 5 in the glass tubes at both ends. As shown in FIG. 2, the glass tube assembly 2 comprises first dual tubes 21a and 21b comprising a glass tube 2a with the electrode 5 and a glass tube 2b without the electrode that are connected with the bridge portion 3a and second dual tubes 22a and 22b comprising two glass tubes 2b without the electrode that are connected with the bridge portion 3a. The first dual tubes 21a and 21b are located in such a manner that the glass tubes 2a with the electrode 5 are located at both ends. The second dual tubes 22a and 22b are located between the first dual tubes 21a and 21b. The first dual tubes 21a and 21b and the second dual tubes 22a and 22b are connected with the bridge portions 3b and 3c. A series of discharge paths are formed between the electrodes 5 in the glass tubes 2a at both ends by the eight glass tubes 2a and 2b and the bridge portions 3a, 3b and 3c connecting these tubes.

A method for manufacturing a fluorescent lamp according to the present invention is characterized especially in the method of forming the bridge portions 3a, 3b and 3c of the glass tube assembly 2 in the fluorescent lamp 1.

The method for manufacturing a fluorescent lamp according to the present invention will be described below.

First Embodiment

In the manufacturing method according to the present invention, first, two of first dual tubes comprising a glass tube with an electrode and a glass tube without an electrode and two of second dual tubes comprising two glass tubes without an electrode are manufactured.

In the method, a required number of the dual tubes are manufactured previously. Then, these dual tubes are connected with a bridge in turn to obtain the glass tube assembly 2 comprising eight glass tubes. Thus, a plurality of bridges can be formed simultaneously, thereby improving the working efficiency as compared with the method of connecting the glass tubes with a bridge one by one in turn as required.

Figures 3A, 3B:
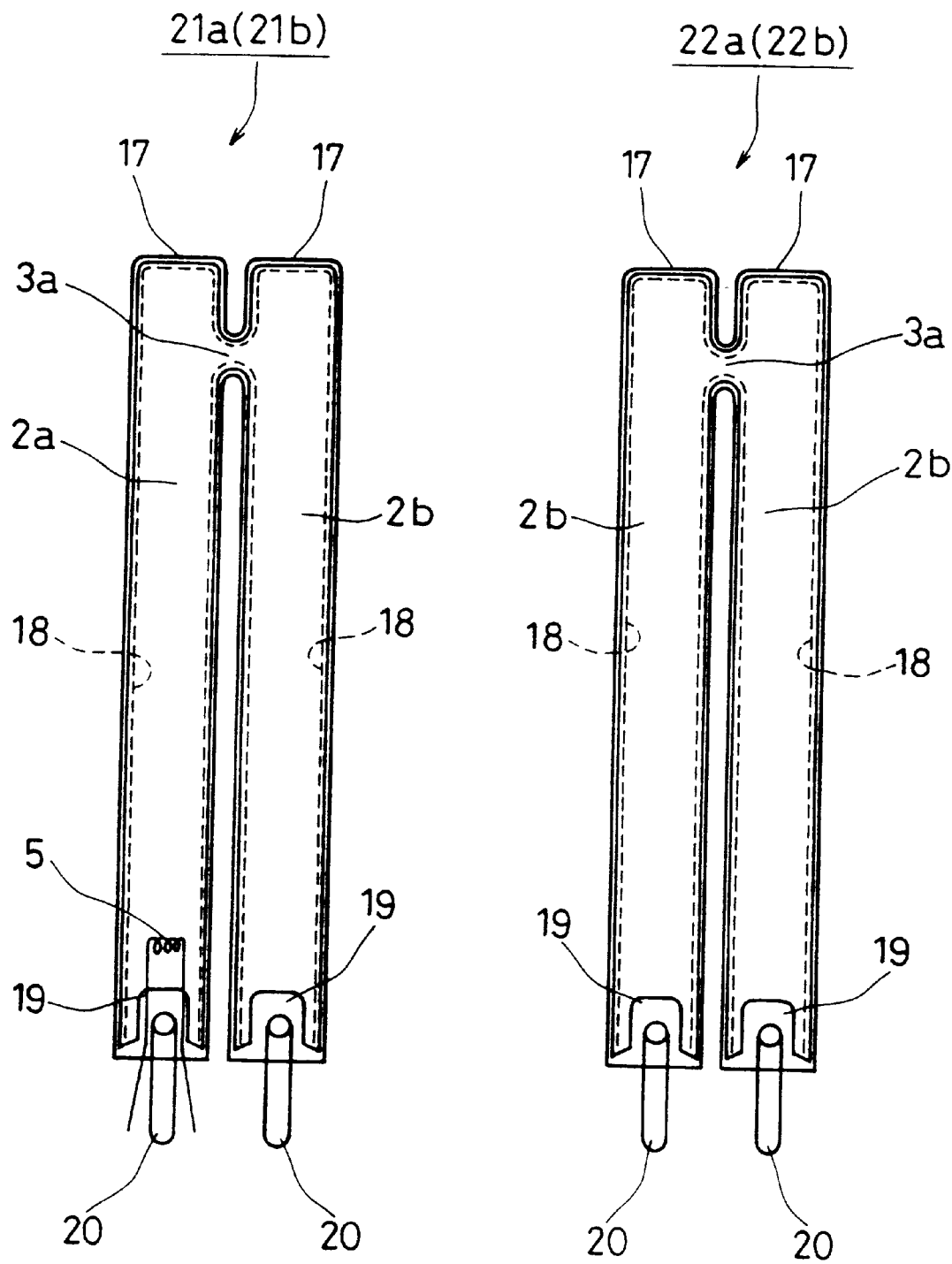
FIG. 3 shows schematic cross-sectional views of the internal structures of dual tubes, FIG. 3(A) showing a first dual tube, and FIG. 3(B) showing a second dual tube.

FIG. 3 shows schematic cross-sectional views of the internal structures of dual tubes. FIG. 3(A) shows the first dual tube, and FIG. 3 (B) shows the second dual tube.

In the first dual tube 21a (or 21b) shown in FIG. 3(A), the glass tube 2a with the electrode 5 and the glass tube 2b without the electrode are connected with the bridge portion 3a as described above. In the second dual tube 22a (or 22b) shown in FIG. 3(B), two glass tubes 2b without the electrode are connected with the bridge portion 3a as described above. For the convenience of later explanation, the first dual tubes are denoted by the reference numerals 21a and 21b for distinction, and the second dual tubes are denoted by the reference numerals 22a and 22b for distinction. However, the structural features of the first dual tubes 21a and 21b and the second dual tubes 22a and 22b are the same respectively.

As the material of the glass tubes 2a and 2b, any known material can be used. For example, soda-lime glass can be used. A phosphor 18 (shown by the broken line in FIG. 3) is applied to the inner surfaces of the glass tubes 2a and 2b by a known method. One end 17 of each of the glass tubes 2a and 2b (the upper end in FIG. 3) is sealed. A stem 19 is formed at the other end (the lower end in FIG. 3) by a known method. The stem 19 is provided with an evacuation tube 20 for evacuation and gas supply in the glass tubes 2a and 2b. In the glass tube 2a, the stem 19 is further provided with the electrode 5. As the electrode 5, any known electrode can be used. For example, an electrode made of a tungsten filament can be used.

The method of forming the bridge portions 3a of the first and second dual tubes is not particularly limited. For example, the method disclosed in Japanese Patent Application (Tokko Sho) No. 63-49334 can be used. That is, the inner surfaces of the glass tubes 2a and 2b are covered with the phosphor 18, one end 17 of each of the glass tubes 2a and 2b is sealed, and the evacuation tube 20 and the stem 19 that is provided with the electrode 5 as required are welded to the other end. Then, portions for bridge connection of sides of the glass tubes 2a and 2b are heated from outside by a gas burner or the like to soften the glass locally. At the same time, a gas, such as an inert gas or air, is supplied into the glass tubes 2a and 2b through the evacuation tubes 20. Thus, opening portions that protrude outward are formed in the locally softened portions. Then, the opening portions of the two glass tubes are welded to each other, and the welded portion is annealed as required for eliminating distortion. Thus, the dual tube 21a (or 21b) or 22a (or 22b) is obtained.

Figure 4A:
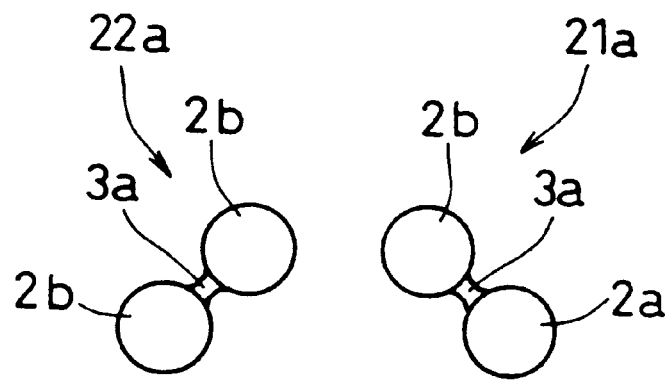
FIG. 4 shows part of the steps of a manufacturing method according to a first embodiment, FIG. 4(A) being a plan view showing a location of dual tubes, FIG. 4(B) being a plan view showing the state in which portions for connection of the first and second dual tubes are heated simultaneously.
Figure 4A:
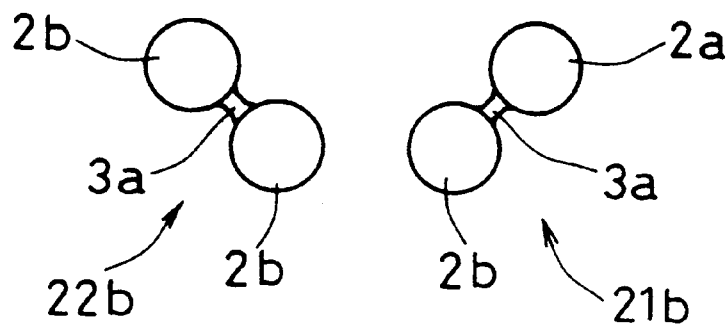

Then, the first dual tubes 21a and 21b and the second dual tubes 22a and 22b that are manufactured as described above are positioned. FIG. 4(A) is a plan view showing the location of these dual tubes.

As shown in FIG. 4(A), the second dual tubes 22a and 22b are located next to each other, the first dual tube 21a is located next to the second dual tube 22a, and the first dual tube 21b is located next to the second dual tube 22b. At this time, the first dual tubes 21a and 21b are located in such a manner that the glass tubes 2b without the electrode are located next to the second dual tubes 22a and 22b. The first and second dual tubes are located apart from each other and in such a manner that the glass tubes are substantially parallel to each other.

At this time, it is preferable to locate the first and second dual tubes in such a manner that the glass tubes are located on substantially the same circumference or at the apexes of a polygon as shown in FIG. 4(A), more preferably in such a manner that the bridge portions 3a of four dual tubes are positioned at the apexes of a rectangle, most preferably a square. Practically, these dual tubes are held by jigs that are provided in such a manner that the dual tubes can move horizontally as described later. In the present invention, the dual tubes are connected with a bridge efficiently by moving the dual tubes horizontally. By previously locating the dual tubes as described above, the movement amount of the dual tubes until the final shape (FIG. 1) is obtained decreases and the horizontal movement is easy. Therefore, the working space decreases, the device is easily designed, and the working efficiency improves.

The glass tubes 2b without the electrode of the first dual tubes 21a and 21b are located next to the second dual tubes 22a and 22b, so that, when the eight glass tubes are connected with bridges, the glass tubes 2a with the electrode are located at both ends so as to form a series of discharge paths between the both electrodes.

The dual tubes 21a, 22a, 22b and 21b should be located at such a distance that the portions for connection can be heated as described later.

It is preferable that the central lines of the glass tubes 2a and 2b are parallel to each other, because the degree of parallelization of the glass tubes at the stage of FIG. 4(A) greatly affects the degree of parallelization of the glass tubes of a final fluorescent lamp since the dual tubes are moved horizontally (in plane that is parallel to the sheet of FIG. 4(A)) for bridge connection as described later.

Furthermore, it is preferable to hold the dual tubes previously in such a manner that they need not be rotated during their horizontal movement as described later, because the device becomes complicated if the dual tubes are rotated during their horizontal movement. More specifically, it is preferable to hold the dual tubes in such a manner that the plane that includes the central lines of the two glass tubes of a dual tube is perpendicular to the plane that includes the central lines of the two glass tubes of the adjacent dual tube. This makes it easy to position the central lines of the glass tubes of the final fluorescent lamp on substantially the same circumference.

Figure 4B:
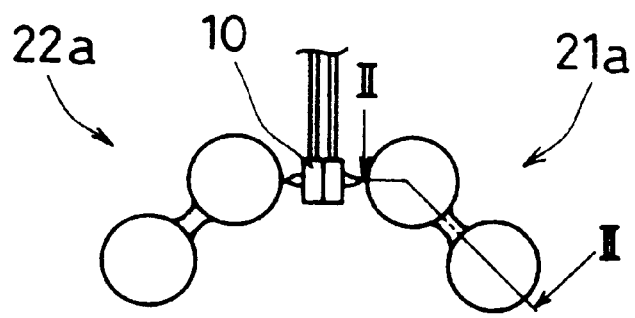
Figure 4B:
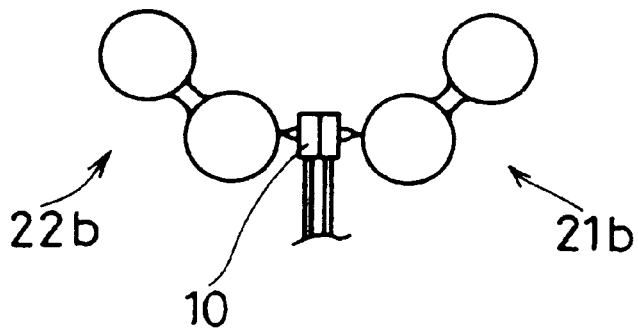

Next, the portions for connection of adjacent first and second dual tubes are heated simultaneously and softened for the formation of opening portions. FIG. 4(B) is a plan view showing the state in which the portions for connection of the first and second dual tubes are heated simultaneously.

In this embodiment, first, the first and second dual tubes are connected with a bridge. In addition, the bridge portion between the first and second dual tubes 21a and 22a as well as the bridge portion between the first and second dual tubes 21b and 22b are formed simultaneously. This shortens the manufacturing time and simplifies the device. Therefore, the expression that "the portions for connection are heated simultaneously" means that four portions for connection that are necessary for simultaneous bridge connection are heated simultaneously.

As shown in FIG. 4(B), a gas burner 10 is inserted between the first dual tube 21a (or 21b) and the second dual tube 22a (or 22b) to heat portions for forming a bridge between them locally.

Figure 5A:
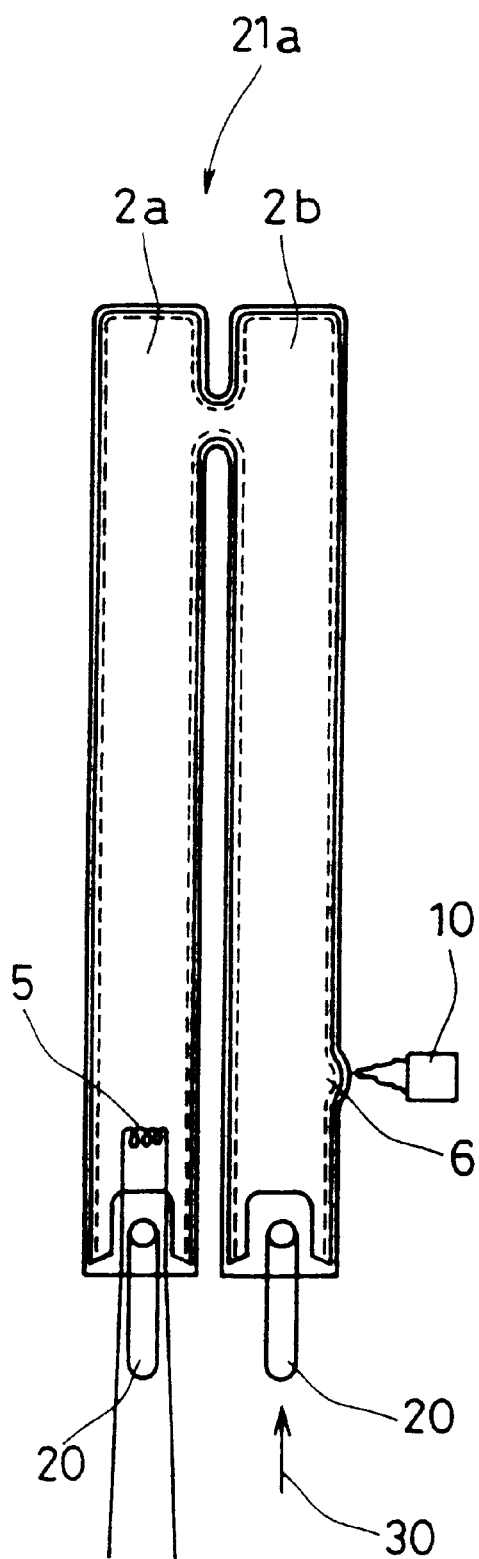
FIG. 5 schematically shows a step of heating and softening portions for connection to form opening portions, showing cross-sectional views of the first dual tube of FIG. 4(B) taken along the line II—II as seen from the arrow directions, FIG. 5(A) showing the state in which a portion for connection is heated and softened locally, and FIG. 5(B) showing the state in which an opening portion is formed in the portion for connection.
Figure 5B:
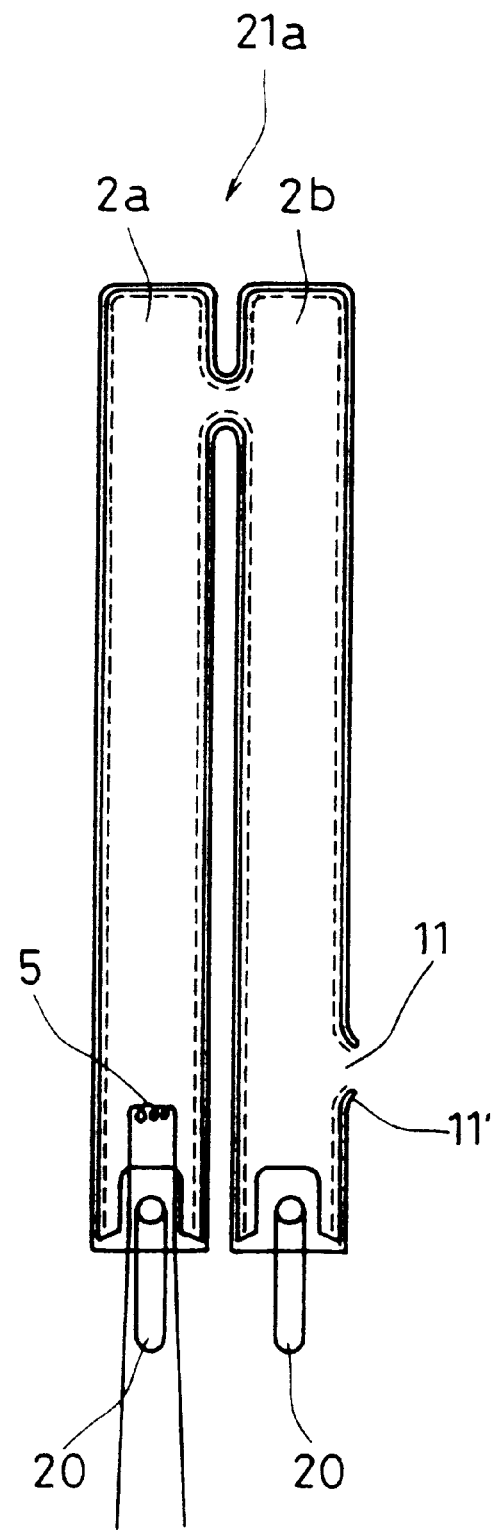

FIG. 5 schematically shows a step of heating and softening the portions for connection to form opening portions, showing cross-sectional views of the first dual tube 21a of FIG. 4(B) taken along the line II—II as seen from the arrow directions.

First, as shown in FIG. 5(A), a portion for connection 6 of the glass tube 2b is heated with the gas burner 10 to soften the glass locally. At the same time, a gas 30, such as an inert gas or air, is injected from the evacuation tube 20. As a result, the wall of the glass tube protrudes outward to form an opening portion 11 having a collar 11' as shown in FIG. 5 (B).

It is preferable to heat the portions for connection by dividing the heating step into preheating and main heating steps in order to reduce a rapid thermal load to the glass tubes and avoid problems, such as the cracking of the heated portions. The specific temperature and temperature increase rate for preheating and main heating depend on the material of the glass and the like, and preferable conditions should be set properly.

Next, the dual tubes with the opening portion are moved so that the opening portions are contacted with and welded to each other for bridge connection. FIG. 6 shows plan views schematically showing the step of forming bridges in this embodiment.

FIG. 6(A) is a plan view showing an example of the movement of the dual tubes with the opening portion.

As shown in FIG. 6(A), the opening portion 11 is formed in the portions for connection in the first dual tubes 21a and 21b, and an opening portion 12 is formed in the portions for connection in the second dual tubes 22a and 22b. The first dual tubes 21a and 21b are simultaneously moved horizontally in a moving direction 31 to contact the opening portions 11 of the first dual tubes 21a and 21b with the opening portions 12 of the second dual tubes 22a and 22b.

In the horizontal movement, in addition to moving only the first dual tubes 21a and 21b as described above, only the second dual tubes 22a and 22b can be moved toward the first dual tubes 21a and 21b, or both the first dual tubes 21a and 21b and the second dual tubes 22a and 22b can be moved to approach each other. However, it is preferable to move only one of the first dual tubes 21a and 21b and the second dual tubes 22a and 22b to approach the other. Variations in the formed bridge portions are reduced by fixing the first dual tubes 21a and 21b or the second dual tubes 22a and 22b. Therefore, a fluorescent lamp having a stable quality can be obtained. also, the device can be simplified.

When the first dual tubes 21a and 21b or the second dual tubes 22a and 22b are moved simultaneously, variations in quality between two bridge portions that are simultaneously formed are smaller than moving the first dual tubes 21a and 21b or the second dual tubes 22a and 22b separately. In addition, the number of working steps decreases, thereby reducing the production time and cost. Furthermore, by equalizing the moving directions of the first dual tubes 21a and 21b or the second dual tubes 22a and 22b in simultaneous movement, the device is easily designed and variations in quality between the formed two bridge portions decrease.

The dual tubes are moved horizontally. Here, the horizontal movement means movement only in the direction that is parallel to the sheet of FIG. 6(A) and does not include the movement component in the direction that is perpendicular to the sheet. The dual tubes can be rotated in a plane that is parallel to the sheet. However, it is preferable not to rotate them because the device can be simplified.

FIG. 6(B) is a plan view showing the state in which the opening portions 11 of the first dual tubes 21a and 21b are contacted with and welded to the opening portions 12 of the second dual tubes 22a and 22b.

Then, the first dual tubes 21a and 21b are pulled back so that the first dual tubes 21a and 21b and the second dual tubes 22a and 22b are spaced at a predetermined distance, thereby forming bridge portions.

FIG. 6(C) is a plan view showing an example of the movement of pulling back the first and/or second dual tubes a predetermined distance.

In FIG. 6(C), the first dual tubes 21a and 21b are simultaneously moved horizontally in a moving direction 32 to complete the bridge portions 3b. Here, it is preferable to move the first dual tubes 21a and 21b or the second dual tubes 22a and 22b simultaneously in the same direction for the same reason as described above for the movement 31 in FIG. 6(A).

A good bridge portion 3b that reliably connects the opening portions without pinholes can be formed by contacting and welding the opening portions 11 and 12 together and pulling back the first and/or second dual tubes a predetermined distance. The distance between the outer walls of the glass tubes during welding (FIG. 6(B)) and pulling back (FIG. 6(C)) is not particularly limited and can be determined properly according to the material of the glass tube, the sizes of the glass tube and the bridge portion, and the like. In a general method for manufacturing a fluorescent lamp, the distance between the outer surfaces of the glass tubes sandwiching the welded portion during welding (FIG. 6(B)) should be about 0 to 0.5 mm and the distance between the outer surfaces of the glass tubes sandwiching the bridge portion 3b during pulling back (FIG. 6(C)) should be about 1 to 3 mm.

In this embodiment, a series of movements of the first dual tubes 21a and 21b, that is, the movement 31 and pulling back 32 of them, are performed simultaneously in the same direction. Such operation improves the working efficiency, simplifies the design of the device, and decreases variations in the quality of the formed bridge portions 3b.

The formed bridge portions 3b are annealed as required. The residual distortion of the bridge portions can be eliminated by setting the temperature decrease rate of the bridge portions properly. The conditions for annealing are not particularly limited and can be determined properly according to the glass material, the sizes of the glass tube and the bridge portion, and the like. In addition, annealing and the next bridge connection step can be performed simultaneously. This shortens the working time and improves the productivity.

After annealing, the bridge portions are cooled gradually to room temperature.

Thus, tube assemblies 23a and 23b comprising the first and second dual tubes that are connected with the bridge are obtained.

Next, the tube assemblies 23a and 23b are connected with a bridge. The method for forming a bridge portion between the tube assemblies 23a and 23b is basically the same as the above method for forming a bridge portion between the first and second dual tubes.

Figure 7:
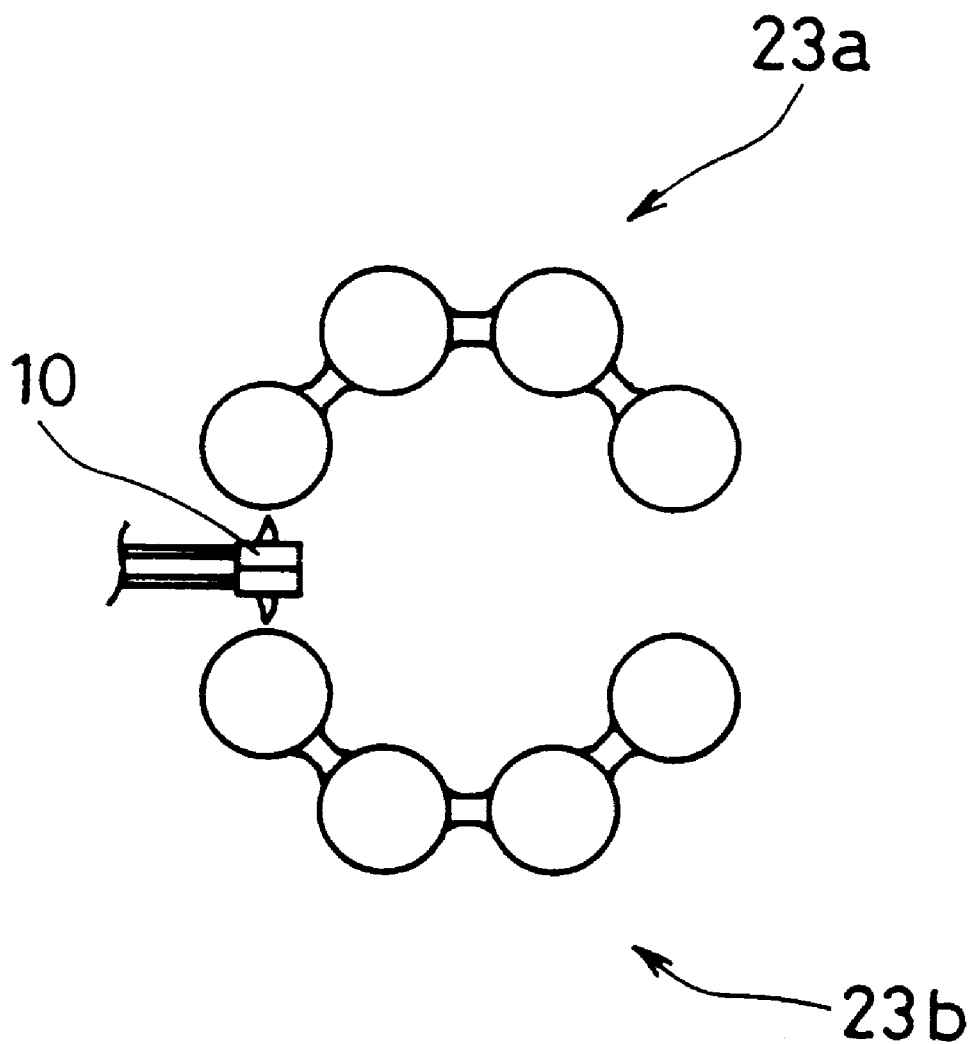
FIG. 7 shows part of the steps of the manufacturing method according to the first embodiment, which is a plan view showing the state in which portions for connection of tube assemblies are simultaneously heated.

First, the portions for connection of the tube assemblies 23a and 23b are heated simultaneously and softened for the formation of opening portions. FIG. 7 is a plan view showing the state in which the portions for connection of the tube assemblies 23a and 23b are heated simultaneously by the gas burner 10.

For the steps of the heating (preheating and main heating) and softening of the portions for connection and the formation of the opening portions, the explanation of FIG. 4(B) and FIGS. 5(A) and (B) can be applied properly, and a detailed explanation is not necessary here.

Next, at least one of the tube assemblies 23a and 23b is moved horizontally so that the opening portions of the tube assemblies 23a and 23b are contacted with and welded to each other. Then, the moved tube assembly is pulled back a predetermined distance, thereby forming a bridge portion.

FIG. 8 shows plan views showing an example of the step of forming a bridge portion between the tube assemblies 23a and 23b.

Figure 8A:
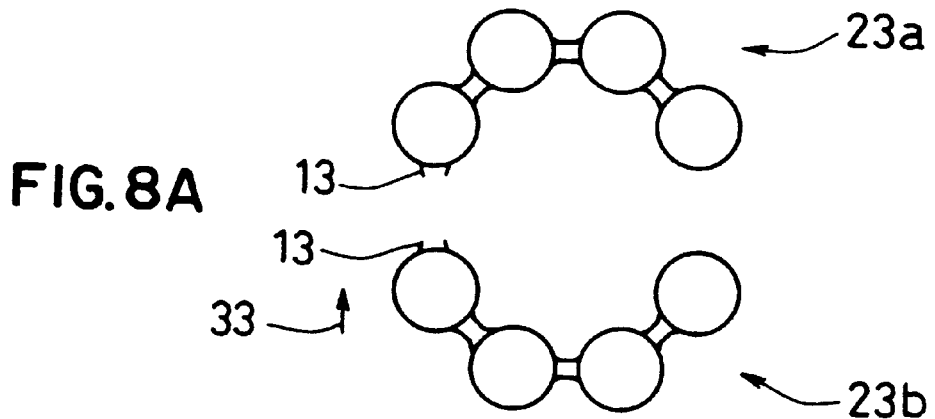
FIG. 8 shows part of the steps of the manufacturing method according to the first embodiment, FIG. 8(A) being a plan view showing an example of the movement of the tube assemblies with an opening portion, FIG. 8(B) being a plan view showing the state in which the opening portions of the tube assemblies are contacted with and welded to each other, and FIG. 8(C) being a plan view of an example of the movement of pulling back the tube assembly (or tube assemblies) a predetermined distance.

FIG. 8(A) is a plan view showing an example of the movement of the tube assemblies with the opening portion.

As shown in FIG. 8(A), an opening portion 13 is formed in the portions for connection of the tube assemblies 23a and 23b. The tube assembly 23b is moved horizontally in a moving direction 33 from this state to contact the opening portions 13 of the tube assemblies 23a and 23b with each other.

In the horizontal movement in this case, in addition to moving only the tube assembly 23b as described above, only the tube assembly 23a can be moved to approach the tube assembly 23b, or both the tube assemblies 23a and 23b can be moved to approach each other. However, it is preferable to move only one of the tube assemblies to approach the other. Variations in the formed bridge portions are decreased by fixing one of the tube assemblies. Therefore, a fluorescent lamp having a stable quality can be obtained. Also, the device can be simplified.

Figure 8B:
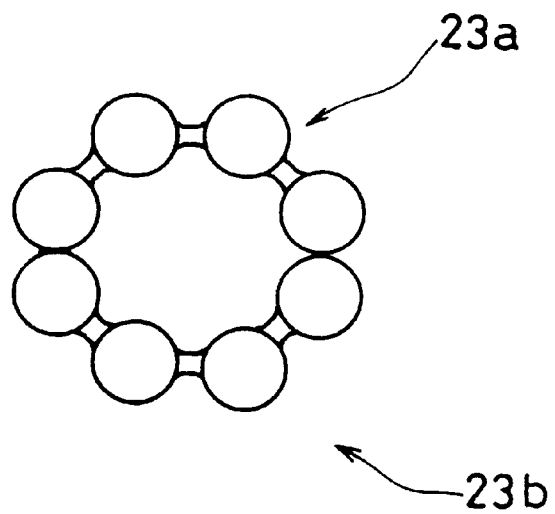

FIG. 8(B) is a plan view showing the state in which the opening portions 13 of the tube assemblies 23a and 23b are contacted with and welded to each other.

Then, the tube assemblies 23a and/or 23b are pulled back a predetermined distance to form a bridge portion.

Figure 8C:
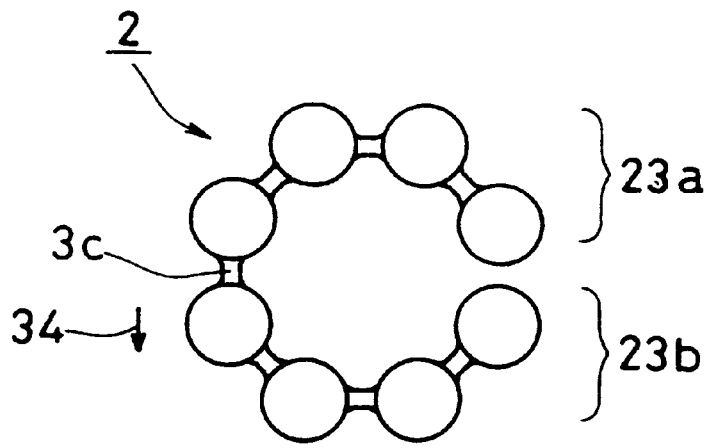

FIG. 8(C) is a plan view of an example of the movement of pulling back the tube assembly (or tube assemblies) a predetermined distance.

In FIG. 8(C), the tube assembly 23a is moved horizontally in a moving direction 34 to complete a bridge portion 3c. Here, it is preferable to move only one of the tube assemblies 23a and 23b for the same reason as described above for the movement 33 in FIG. 8(A).

The bridge portion is formed by contacting and welding the opening portions 13 together and pulling back the tube assembly (or tube assemblies) a predetermined distance and the formed bridge portion is annealed as required as in the bridge portion 3b between the first and second dual tubes.

In this embodiment, the second dual tube 22a is not moved from the state of FIG. 4(A) to the state of FIG. 8(C) where the connection of the eight glass tubes with the bridges is completed, and other three dual tubes can be thought of as collected toward the second dual tube 22a for bridge connection. By fixing one of the dual tubes in this manner, there is no waste of the device for moving the dual tubes for bridge connection and the jigs. Thus, the device and the jigs can be placed in a small space without difficulty. Therefore, the production efficiency improves, and a fluorescent lamp can be manufactured at a low cost In addition, by reducing the number of moving members, the rigidity of the device improves and the vibration and wavering of the device during manufacture decrease. Therefore, a fluorescent lamp having a stable quality can be manufactured.

After annealing, the bridge portion is cooled gradually for a predetermined time to room temperature. Then, the evacuation of the glass tubes, the enclosure of Hg and a rare gas, the sealing of the evacuation tubes, the mounting of a base, and the like are performed as in the general method for manufacturing a fluorescent lamp. Thus, the fluorescent lamp 1 as shown in FIGS. 1 and 2 is obtained.

Second Embodiment

In this embodiment, unlike the first embodiment, first, the second dual tubes are connected with a bridge to form a tube assembly, then the first dual tubes are connected simultaneously on both sides of the tube assembly so as to manufacture a fluorescent lamp.

At least one of the second dual tubes 22a and 22b is moved horizontally from the state of FIG. 4(A) to form a tube assembly comprising the second dual tubes 22a and 22b that are connected with a bridge.

Then, at least one of the tube assembly and the first dual tubes 21a and 21b that are located on both sides of the tube assembly is moved horizontally to complete the connection of eight glass tubes with bridges. It is possible to simultaneously move the first dual tubes 21a and 21b horizontally while fixing the tube assembly, or it is possible to move the tube assembly horizontally while fixing the first dual tubes 21a and 21b.

In this embodiment, the location of the dual tubes in the state of FIG. 4(A) should previously be determined optimally for their movement because the movement order is different from that of the first embodiment.

Except for the above points, the above description of the first embodiment can be applied to this embodiment directly or with some changes according to their difference.

EXAMPLE

The structure and effect of the present invention will be described below more specifically by way of example.

The fluorescent lamp as shown in FIG. 1 was manufactured by the method of the first embodiment (FIGS. 3 to 8) as described above.

A more specific manufacturing method is as follows.

Two of first dual tubes as shown in FIG. 3(A) and two of second dual tubes as shown in FIG. 3(B) were prepared by using soda-lime glass tubes having an outer diameter of 12 mm and a length of 120 mm, whose inner surface was coated with a predetermined amount of a three band phosphor having a color temperature of 3,000 K. The bridge portions 3a were formed as described in the first embodiment. A tungsten filament electrode was used as the electrode 5.

Then, as shown in FIG. 4(A), the glass tubes were set to jigs, which can move horizontally, in such a manner that the central lines of the glass tubes were parallel to each other. At this time, the dual tubes were located in such a manner that the bridge portions 3a of the four dual tubes were positioned at the apexes of a square and that the plane that included the central lines of the two glass tubes of a dual tube was perpendicular to the plane that included the central lines of the two glass tubes of the adjacent dual tube.

Then, as shown in FIG. 4(B), four portions for connection were simultaneously heated with a gas burner and softened to form opening portions. The portions for connection were preheated for 20 to 25 seconds to increase their temperature from 300° C. to 700° C., then these portions were maintained at 1,000° C. or more for about 5 seconds for main heating to melt the glass sufficiently.

After the formation of the opening portions, the first dual tubes 21a and 21b with the glass melted were simultaneously moved horizontally in the moving direction 31 as shown in FIG. 6(A), and the opening portions 11 of the first dual tubes 21a and 21b and the opening portions 12 of the second dual tubes 22a and 22b were contacted with each other and held for a constant time for welding. Then, the first dual tubes 21a and 21b were simultaneously pulled back in the moving direction 32 so that the first dual tubes 21a and 21b and the second dual tubes 22a and 22b were spaced at a predetermined distance, thereby forming bridge portions 3b. The distance between the outer surfaces of two glass tubes sandwiching the welded portion in the state where the opening portions were welded to each other (the state of FIG. 6(B)) was about 0.3 mm. The distance between the outer surfaces of the glass tubes sandwiching the bridge portion 3b in the pulled back state (the state of FIG. 6(C)) was about 1.8 mm.

Then, as shown in FIG. 7 and FIGS. 8(A) to (C), the tube assemblies 23a and 23b were connected with the bridge portion 3c. At the same time, the previously formed bridge portions 3b were annealed for eliminating distortion. That is, the bridge portions 3b were annealed by decreasing their temperature from 600° C. to 400° C. for about 15 to 20 seconds. The annealing was completed at the end of the pulling back step in FIG. 8(C), and then gradual cooling was started. It took about 50 seconds from the start of the preheating in FIG. 4(B) to the end of the annealing of the bridge portions 3b.

At substantially the same time that the gradual cooling of the bridge portions 3b was started, the annealing of the bridge portion 3c was started. The bridge portion 3c was annealed and cooled gradually under the same conditions as the bridge portions 3b. Thus, the connection of eight glass tubes with bridges was completed.

Then, a predetermined amount of Hg and argon were enclosed in the discharge path, the evacuation tubes 20 were sealed, and the base 4 was formed. Thus, a compact fluorescent lamp having a rated power of 40 W as shown in FIG. 1 was manufactured.

The above step of connecting the glass tubes with the bridges was performed in a small manufacturing space and with good production efficiency. The size and accuracy of the obtained fluorescent lamp were controlled correctly. In addition, the strength of the bridge portions did not decrease and the bridge portions were not damaged during handling and up to the life end. Also, variations in the quality of the bridge portions were minor, and the fluorescent lamp had a stable quality.

As described above, in forming continuous discharge paths by connecting eight glass tubes with bridges in the method for manufacturing a fluorescent lamp according to the present invention, four dual tubes are located optimally, a plurality of portions for connection are simultaneously heated, the dual tubes are simultaneously moved horizontally, bridge connection at a plurality of portions is simultaneously performed, and the annealing and gradual cooling of the bridge portions and bridge connection at other portions are performed simultaneously. Thus, all devices that are necessary for bridge formation can be used in a small space, the productivity can be improved significantly due to the shortening of working time, and the cost can be reduced.

In addition, the quality of the bridge portions, such as their size and accuracy, can be controlled sufficiently, and a stable quality can be maintained with minor variations in the strength of the bridge portions, thereby practically providing excellent effects.

The invention may be embodied in other forms without departing from the spirit or essential characteristics thereof. The embodiments disclosed in this application are to be considered in all respects as illustrative and not limitative, the scope of the invention is indicated by the appended claims rather than by the foregoing description, and all changes which come within the meaning and range of equivalency of the claims are intended to be embraced therein.

What is claimed is:

1. A method for manufacturing a fluorescent lamp comprising eight glass tubes that are arranged parallel to each other around a central axis and connected with a bridge in turn to form a discharge path, comprising steps of:

manufacturing two of first dual tubes comprising a glass tube with an electrode and a glass tube without an electrode that are connected with a bridge and two of second dual tubes comprising two glass tubes without an electrode that are connected with a bridge;

locating each of the first and second dual tubes substantially parallel to each- other at a distance in such a manner that one of the first dual tubes is located on each side of two of the second dual tubes, with the glass tubes with the electrode located distally with respect to the second dual tubes;

simultaneously heating portions for connection of each of the first and second dual tubes that are adjacent to each other to soften and form opening portions;

moving each of the first and second dual tubes with the opening portion horizontally so that the opening portions are contacted with and welded to each other, and pulling back the moved dual tube a predetermined distance, thereby forming two tube assemblies comprising the first and second dual tubes that are connected with a bridge;

simultaneously heating portions for connection of the two tube assemblies to soften and form opening portions; and moving at least one of the tube assemblies horizontally so that the opening portions are contacted with and welded to each other, and pulling back the moved tube assembly a predetermined distance, thereby completing connection of the eight glass tubes with bridges.

2. The method according to claim 1, wherein each glass tube is positioned on substantially the same circumference or at an apex of a polygon in locating the first and second dual tubes substantially parallel to each other at a distance.

3. The method according to claim 1, wherein the bridges between the first and second dual tubes are formed by moving two of the first or second dual tubes simultaneously.

4. The method according to claim 1, wherein the bridge between the tube assemblies is formed by moving only one of the tube assemblies.

5. The method according to claim 1, wherein one of the dual tubes is not moved horizontally during bridge formation.

6. The method according to claim 1, wherein the bridges between the first and second dual tubes are annealed while forming the bridge between the two tube assemblies.

7. The method according to claim 1, wherein the heating of the portions for connection comprises preheating and main heating.

8. A method for manufacturing a fluorescent lamp comprising eight glass tubes that are arranged parallel to each other around a central axis and connected with a bridge in turn to form a discharge path, comprising steps of:

manufacturing two of first dual tubes comprising a glass tube with an electrode and a glass tube without an electrode that are connected with a bridge and two of second dual tubes comprising two glass tubes without an electrode that are connected with a bridge;

locating each of the first and second dual tubes substantially parallel to each other at a distance in such a manner that one of the first dual tubes is located on each side of two of the second dual tubes, with the glass tubes with the electrode located distally with respect to the second dual tubes;

simultaneously heating portions for connection of two of each of the second dual tubes that are adjacent to each other to soften and form opening portions;

moving each of the second dual tubes with the opening portion horizontally so that the opening portions are contacted with and welded to each other, and pulling back the moved second dual tube a predetermined distance, thereby forming a tube assembly comprising two of the second dual tubes that are connected with a bridge;

simultaneously heating portions for connection of the tube assembly and the first dual tubes on both sides of the tube assembly to soften and form opening portions; and moving at least one of the tube assembly and the first dual tubes horizontally so that the opening portions are contacted with and welded to each other, and pulling back the at least one of the tube assembly and the first dual tubes a predetermined distance, thereby completing connection of the eight glass tubes with bridges.

9. The method according to claim 8, wherein the bridge between two of the second dual tubes is formed by moving only one of the second dual tubes.

10. The method according to claim 8, wherein the bridges between the tube assembly and the first dual tubes are formed by moving the tube assembly or moving two of the first dual tubes simultaneously.

11. The method according to claim 8, wherein one of the dual tubes is not moved horizontally during bridge formation.

12. The method according to claim 8, wherein the bridge between the second dual tubes of the tube assembly is annealed while forming the bridges between the tube assembly and the first dual tubes on both sides of the tube assembly.

13. The method according to claim 8, wherein the heating of the portions for connection comprises preheating and main heating.

* * * * *